US012783897B2

(12) United States Patent
Hung et al.

(10) Patent No.: US 12,783,897 B2
(45) Date of Patent: Nov. 3, 2026

(54) METHOD OF TRAINING A NEURAL NETWORK FOR PREDICTIVE TASKS AND ASSOCIATED APPARATUS AND SYSTEM

(71) Applicant: The Boeing Company, Arlington, VA (US)

(72) Inventors: Fan Hin Hung, Los Angeles, CA (US); Deepak Khosla, Camarillo, CA (US); Neale Ratzlaff, Los Angeles, CA (US); Tameez Latib, Calabasas, GA (US); Haden Smith, Guyton, GA (US); Leon Nguyen, Santa Ana, CA (US)

(73) Assignee: The Boeing Company, Arlington, VA (US)

( * ) Notice: Subject to any disclaimer, the term of this patent is extended or adjusted under 35 U.S.C. 154(b) by 504 days.

(21) Appl. No.: 18/521,954

(22) Filed: Nov. 28, 2023

(65) Prior Publication Data

US 2025/0173575 A1 May 29, 2025

(51) Int. Cl.
*G06N 3/091* (2023.01)
*G06T 7/246* (2017.01)
*G06T 7/73* (2017.01)

(52) U.S. Cl.
CPC ............ *G06N 3/091* (2023.01); *G06T 7/246* (2017.01); *G06T 7/73* (2017.01);
(Continued)

(58) Field of Classification Search
None
See application file for complete search history.

(56) References Cited

U.S. PATENT DOCUMENTS 7,980,512 B1 7/2011 Speer
8,854,433 B1 10/2014 Rafii
(Continued)

FOREIGN PATENT DOCUMENTS

CN 110097574 8/2019
EP 3566949 A1 11/2019
(Continued)

OTHER PUBLICATIONS

Dao et al., "A Kernel Theory of Modern Data Augmentation," Mar. 20, 2019, https://arxiv.org/abs/1803.06084.*
(Continued)

*Primary Examiner* — Ryan Barrett
(74) *Attorney, Agent, or Firm* — Massey Bean & Lewis

(57) ABSTRACT

Methods, apparatuses and systems of training neural networks for predictive tasks are disclosed. The method includes training a neural network within a closed-loop framework, where the focus is on predicting target tasks for an object. The method identifies situations and inputs (i.e., augmentations) that lead to higher errors in the neural network's predictions by calculating a loss value between predicted target tasks and known target tasks during a baseline training period. An optimizer uses the loss value to predict correlations between augmentations and loss values and identifies difficult augmentations. The difficult augmentations are then intentionally emphasized during subsequent training periods, to increase the likelihood that the neural network is trained on difficult augmentations to enhance the neural network's capacity to adapt and learn from error-prone conditions.

20 Claims, 6 Drawing Sheets

(52) U.S. Cl.
CPC ............... *G06T 2207/10032* (2013.01); *G06T 2207/20081* (2013.01); *G06T 2207/20084* (2013.01)

(56) References Cited

U.S. PATENT DOCUMENTS

| | | | |
|---|---|---|---|
| 8,994,723 B2 | 3/2015 | Drost et al. | |
| 9,150,310 B1 | 10/2015 | Bray et al. | |
| 10,565,731 B1 | 2/2020 | Reddy | |
| 10,909,715 B1 | 2/2021 | Boggs | |
| 10,929,654 B2 | 2/2021 | Iqbal | |
| 10,937,189 B2 | 3/2021 | Li et al. | |
| 11,254,440 B2 | 2/2022 | Ropers | |
| 11,459,116 B2 | 10/2022 | Kyono et al. | |
| 11,748,913 B2 | 9/2023 | Ali et al. | |
| 11,827,203 B2 | 11/2023 | Chakravarty et al. | |
| 11,880,503 B1 | 1/2024 | Haentjens | |
| 12,139,271 B2 | 11/2024 | Khosla | |
| 2007/0023575 A1 | 2/2007 | von Thal | |
| 2017/0073080 A1 | 3/2017 | Hughes | |
| 2018/0173839 A1 | 6/2018 | Fang | |
| 2018/0178924 A1 | 6/2018 | Zomeno Rodriguez | |
| 2019/0031347 A1 | 1/2019 | Duan | |
| 2019/0344902 A1 | 11/2019 | Cramblitt | |
| 2019/0355150 A1 | 11/2019 | Tremblay et al. | |
| 2019/0382126 A1 | 12/2019 | Rix et al. | |
| 2020/0217666 A1 | 7/2020 | Zhang | |
| 2020/0226426 A1* | 7/2020 | Jarquin Arroyo .. | G06V 10/7747 |
| 2021/0117661 A1 | 4/2021 | Iqbal | |
| 2021/0304438 A1 | 9/2021 | Ye | |
| 2021/0314551 A1 | 10/2021 | Tang | |
| 2022/0075994 A1 | 3/2022 | Shapira et al. | |
| 2022/0108468 A1 | 4/2022 | Nakamura | |
| 2022/0212811 A1 | 7/2022 | Deepak et al. | |
| 2022/0215571 A1 | 7/2022 | Leach | |
| 2022/0258875 A1 | 8/2022 | Kyono | |
| 2022/0276652 A1 | 9/2022 | Kyono et al. | |
| 2022/0277472 A1 | 9/2022 | Birchfield et al. | |
| 2022/0292772 A1 | 9/2022 | Wang | |
| 2022/0306311 A1 | 9/2022 | Kyono | |
| 2022/0413119 A1 | 12/2022 | Starr | |
| 2022/0414911 A1 | 12/2022 | Wang | |
| 2023/0244835 A1 | 8/2023 | Guo | |
| 2023/0244905 A1* | 8/2023 | Zoldi ..................... | G06N 3/042 706/12 |
| 2023/0281864 A1 | 9/2023 | Guo | |
| 2023/0281945 A1 | 9/2023 | Cashman | |
| 2024/0375786 A1 | 11/2024 | Hung et al. | |
| 2024/0378744 A1 | 11/2024 | Smith et al. | |
| 2024/0391494 A1 | 11/2024 | Rosenblum et al. | |
| 2025/0011002 A1 | 1/2025 | Latib et al. | |
| 2025/0022157 A1 | 1/2025 | Latib et al. | |
| 2025/0164944 A1* | 5/2025 | Oyama .................. | B25J 9/1656 |
| 2025/0178741 A1 | 6/2025 | Hung et al. | |
| 2025/0182398 A1 | 6/2025 | Hung et al. | |
| 2025/0190906 A1* | 6/2025 | Yin .................. | G06Q 10/06315 |

FOREIGN PATENT DOCUMENTS

| | | |
|---|---|---|
| EP | 4024340 | 7/2022 |
| EP | 4024346 | 7/2022 |
| WO | 2025003634 | 1/2025 |

OTHER PUBLICATIONS

Oksuz et al., "Imbalance Problems in Object Detection: A Review," Mar. 11, 2020, https://arxiv.org/abs/1909.00169.*

Parsons et al., Analysis of Simulated Imagery for Real-Time Vision-Based Automate Aerial Refueling, Journal of Aerospace Information Systems, Mar. 2019, pp. 77-93, vol. 16, No. 3.

Newell et al., Stacked Hourglass Networks for Human Pose Estimation, Jul. 2016, pp. 1-17, article obtain from https://arxiv.org/pdf/1603.06937 Sep. 16, 2025.

Extended European Search Report for EP Patent Application No. 24200751.6 dated Mar. 7, 2025.

Dementhon, et al., Model-Based Object Pose in 25 Lines of Code, pp. 1-9.

Extended European Search Report for EP Patent Application No. 24196940.1 dated Mar. 7, 2025.

Wang et al., Revisiting Monocular Satellite Pose Estimation With Transformer, IEEE Transactions on Aerospace and Electronic Systems, Oct. 2022, pp. 4279-4294, vol. 58, No. 5.

Chen et al., Satellite Pose Estimation with Deep Landmark Regression and Nonlinear Pose Refinement, Computer Vision Foundation, 2019, pp. 1-9.

Quang et al., Monocular Vision and Machine Learning for Pose Estimation, 2023, pp. 128-136.

Extended European Search Report for EP Patent Application No. 24196935.1 dated Feb. 6, 2025.

Shi et al., Fast Uncertainty Quantification for Deep Object Pose Estimation, IEEE International Conference on Robotics and Automation, May 2021, pp. 5200-5207.

Vaghi et al., A Comparison of Uncertainty Estimation Approaches for DNN-based Camera Localization, Nov. 2022, pp. 1-7.

Extended European Search Report for EP Patent Application No. 21205493.6 dated Mar. 31, 2022.

Doebbler, et al., "Boom and Receptacle Autonomous Air Refueling Using Visual Snake Optical Sensor", Journal of Guidance and Control and Dynamics, Nov. 1, 2007, pp. 1753-1769, vol. 30, No. 6.

Anderson, et al., "Augmenting Flight Imagery from Aerial Refueling", Oct. 21, 2019, Computer Vision—ECCV 2020 : 16th European Conference, Glasgow, UK, Aug. 23-28, 2020, pp. 154-165, Proceedings; [Lecture Notes in Computer Science ; ISSN 0302-9743], Springer International Publishing, Cham.

Soujanya, et al. "Addressing corner detection issues for machine vision based UAV aerial refueling" Machine Vision and Applications, Springer, Jan. 10, 2007, pp. 261-276, vol. 18, No. 5, Berlin, DE.

Duan, et al., "Visual Measurement in Simulation Environment for Vision-Based UAV Autonomous Aerial Refueling", IEEE Transactions on Instrumentation and Measurement, IEEE, USA, Sep. 1, 2015, pp. 2468-2480, vol. 64, No. 9, USA.

Cui, et al., "Visual Servoing of a Flexible Aerial Refueling Boom With an Eye-in-Hand Camera", IEEE Transactions on Systems, Man, and Cybernetics: Systems, IEEE, Jan. 8, 2020, pp. 6282-6292, vol. 51, No. 10, Piscataway, NJ, USA.

Lakshminarayanan, et al. "Simple and Scalable Predictive Uncertainty Estimation using Deep Ensembles", 31st Conference on Neural Information Processing Systems (NIPS 2017), 2017, pp. 1-15, Long Beach, CA, USA.

Shen, et al., "Real-Time Uncertainty Estimation in Computer Vision via Uncertainty-Aware Distribution Distillation", Computer Vision Foundation, 2021, pp. 707-716.

Peng, et al., "PVNet: Pixel-wise Voting Network for 6DoF Pose Estimation", Computer Vision Foundation, pp. 4561-4570.

Brachmann, et al., "Uncertainty-Driven 6D Pose Estimation of Objects and Scenes from a Single RGB Image", Computer Vision Foundation, pp. 3364-3372.

Rasmussen, C.E., "Gaussian Processes in Machine Learning", Max Planck Institute for Biological Cybernetics, pp. 63-71, Tubingen, Germany.

Romano, et al., "Conformalized Quantile Regression", 33rd Conference on Neural Information Processing Systems, 2019, pp. 1-11, Vancouver, Canada.

Ratzlaff, et al. "Generative Particle Variational Inference via Estimation of Functional Gradients", Proceedings of the 38th International Conference on Machine, 2021, pp. 1-22.

Tobin et al., "Domain Randomization for Transferring Deep Neural Networks from Simulation to the Real World", https://arxiv.org/pdf/1703.06907.pdf, accessed Dec. 5, 2023, pp. 1-8.

Mehta, et al. "Active Domain Randomization", https://arxiv.org/pdf/1904.04762.pdf, accessed Dec. 5, 2023, pp. 1-15.

Akkaya et al., "Solving Rubik's Cube With a Robot Hand", https://arxiv.org/pdf/1910.07113.pdf, accessed Dec. 5, 2023, pp. 1-51.

(56) References Cited

OTHER PUBLICATIONS

Extended European Search Report for EP Patent Application No. 24171550.7 dated Oct. 16, 2024, pp. 1-13.
Gupta, et al., "CullNet: Calibrated and Pose Aware Confidence Scores for Object Pose Estimation", 2019 IEEE/CVF International Conference on Computer Vision Workshop (ICCVW), IEEE, Oct. 27, 2019, pp. 2758-2766.
Klein, et al., "Uncertainty in Data-Driven Kalman Filtering for Partially Known State-Space Models", ICASSP 2022—2022 IEEE International Conference on Acoustics, Speech, and Signal Processing (ICASSP), IEEE, May 23, 2022, pp. 3194-3198.
Shi, et al., "Fast Uncertainty Quantification for Deep Object Pose Estimation", Arvix.org, Cornell University Library, Nov. 16, 2020, pp. 1-8.
Teng Chin-Hung, "Enhanced Outlier Removal for Extended Kalman Filter based Visual Inertial Odometry", 2018 IEEE International Conference on Applied System Innovation (ICASI), IEEE, Apr. 13, 2018, pp. 74-77.
Extended European Search Report for EP Patent Application No. 24182647.8 dated Oct. 24, 2024, pp. 1-7.
Extended European Search Report for EP Patent Application No. 24183945.5 dated Nov. 20, 2024, pp. 1-8.
Lee, et al., "Long-Range Pose Estimation for Aerial Refueling Approaches Using Deep Neural Networks", Journal of Aerospace Information Systems, vol. 17, No. 11, Nov. 1, 2020, pp. 634-646.
Thomas, et al., "Advances in air to air refuelling", Progress in Aerospace Sciences, vol. 71, Jul. 28, 2014, pp. 14-35.
Fu, et al. "The 60 pose estimation of the aircraft using geometric property." IEEE Transactions on Circuits and Systems for Video Technology, Jul. 2023, pp. 3358-3368, vol. 33, No. 7.
Hashemi, M., "Enlarging smaller images before inputting into convolutional neural network: zero-padding vs. interpolation." Journal of Big Data, 2019, pp. 1-13.
Saponara, et al. Impact o Image Resizing on Deep Learning Detectors for Training Time and Model Performance, Department of Information Engineering, University of Pisa, Italy, 2022, pp. 10-17.
Zhao, et al., "Estimating 6D Pose From Localizing Designated Surface Keypoints", https://arxiv.org/pdf/1812.01387.pdf, accessed Dec. 5, 2023, pp. 1-9.
Xiao et al., "Simple Baselines for Human Pose Estimation and Tracking", https://arxiv.org/pdf/1804.06208.pdf, accessed Dec. 5, 2023, pp. 1-9.
Suwajanakorn, et al., "Discovery of Latent 3D Keypoints via End-to-end Geometric Reasoning", https://keypointnet.github.io/keypointnet_neurips.pdf, accessed Dec. 5, 2023, pp. 1-12.
Lee, et al., "Camera-to-Robot Pose Estimation from a Single Image", 2020 IEEE International Conference on Robotics and Automation (ICRA), 2020, pp. 9426-9432, Paris, France.
Bashir, et al., "Small Object Detection in Remote Sensing Images with Residual Feature Aggregation-Based Super-Resolution and Object Detector Network", Remote Sens., 2021, 13, 1854, pp. 1-21.
Unel, et al., "The Power of Tiling for Small Object Detection", Computer Vision Foundation, pp. 1-10.
Lee, et al., "Online Extrinsic Camera Calibration for Temporally Consistent IPM Using Lane Boundary Observations with a Lane Width Prior", https://arxiv.org/pdf/2008.03722.pdf, accessed Dec. 5, 2023, pp. 1-6.
Zhang, et al., "A Flexible Online Camera Calibration Using Line Segments", Journal of Sensors, 2016, vol. 2016, Article ID 2802343, pp. 1-17, Hindawi Publishing Corporation.
Liu et al., Simple and Principled Uncertainty Estimation with Deterministic Deep Learning via Distance Awareness, 34th Conference on Neural Information Processing Systems, 2020, pp. 1-15, Vancouver, CA.
Guo et al., On Calibration of Modern Neural Networks, Proceedings of the 34th International Conference on Machine Learning, Aug. 3, 2017, pp. 1-14, Sydney, Australia.
Pavlakos, et al., 6-DoF Object Pose from Semantic Keypoints, 2017 IEEE Internation Conference on Robotics and Automation, pp. 1-8.
Hao et al., Scale-unambiguous relative pose estimation of space uncooperative targets based on the fusion of three-1 dimensional time-of-flight camera and monocular camera, Optical Engineering, May 2015, pp. 1-12, vol. 54(5).
Wang et al., Normalized Object Coordinate Space for Category-Level 6D Object Pose and Size Estimation, 2019, pp. 2637-2646, 2019 IEEE/CVF Conference on Computer Vision and Pattern Recognition.
Fornalczyk et al., Robust Face Model Based Approach to Head Pose Estimation, 2017, pp. 1291-1295, Proceedings of hte Federated Conference on Computer Science ad Information Systems, vol. 11.
Extended European Search Report for EP Patent Application No. 24165111.6 dated Jul. 10, 2024.
Lynch, J. C., Monocular Pose Estimation for Automated Aerial Refueling via Perspective-n-PointPerspective-n-Point, AFIT Scholar, Mar. 2022, pp. 1-76, accessed from https://scholar.afit.edu/cgi/viewcontent.cgi?article=7913&context=etd Jul. 17, 2024.
EP Office Action for EP Patent Application No. 24182647.8 dated Mar. 17, 2026.
Extended European Search Report for EP Patent Application No. 24192391.1 dated Jan. 24, 2025, pp. 1-13.
Extended European Search Report for EP Patent Application No. 24192395.2 dated Jan. 24, 2025, pp. 1-12.
Li et al., Deep Supervision with Intermediate Concepts, IEEE Transactions On Pattern Analysis and Machine Intelligence, Aug. 2019, pp. 1828-1843, vol. 41, No. 8.
Reddy et al.,. Occlusion-Net: 2D/3D Occluded Keypoint Localization Using Graph Networks, 2019, IEEE/CVF Conference on Computer Vision and Pattern Recognition, pp. 7318-7327, IEEE Computer Society.
Park et al., Robust multi-task learning and online refinement for spacecraft pose estimation across domain gap, 2023, pp. 1-15, Advances in Space Research.
Gong et al., Research of an Unmanned Aerial Vehicle Autonomous Aerial Refueling Docking Method Based on Binocular Vision, 2023, pp. 1-21, 7, 433.
Morreale et al., Neural Semantic Surface Maps, Sep. 9, 2023, pp. 1-15.
Reed, Benjamin B., The Restore-L Servicing Mission, Mar. 29, 2016, pp. 1-32, retrieved from URL:https://www.nasa.gov/wp-content/uploads/2015/03/reed_restorel_tagged.pdf Jan. 14, 2025.

* cited by examiner

METHOD OF TRAINING A NEURAL NETWORK FOR PREDICTIVE TASKS AND ASSOCIATED APPARATUS AND SYSTEM

FIELD

This disclosure relates generally to neural networks, and more particularly to training neural networks for predictive tasks.

BACKGROUND

Neural networks have gained significant important in various applications, including neural networks used for predictive tasks. An important aspect of training neural networks is the availability of diverse and representative training data. To achieve high diversity in training data, techniques such as domain randomization have been employed. Domain randomization involves the application of various augmentations to generate a vast and diverse input space for training. Although domain randomization effectively covers a substantial range of input variation, the finite learning capacity of neural networks can result in underexplored regions when uniformly sampling augmented training data. Inadequate training in difficult regions within the input space limits the neural network's adaptability and proficiency, leading to performance issues within these difficult regions.

SUMMARY

The subject matter of the present application has been developed in response to the present state of the art, and in particular, in response to the problems of and needs created by, or not yet fully solved by, typical training of neural networks. Generally, the subject matter of the present application has been developed to provide a method of training neural networks used for prediction that overcomes at least some of the above-discussed shortcomings of prior art techniques.

Disclosed herein in a method of training a neural network used for prediction. The method includes obtaining input data configured to be augmentable. The method also includes defining an augmentation space including a set of parameter values and randomly selecting a subset of parameter values to augment the input data to generate a plurality of augmented input data. During a baseline training period, the method further includes, predicting a target task in each one of the plurality of augmented input data using a target task detector to generate predicted target tasks. The method additionally includes comparing the predicted target tasks in each one of the plurality of augmented input data to known target tasks to calculate a loss value for the corresponding one of the plurality of augmented input data. The loss value defines a difference between the predicted target tasks during the baseline training period and the known target tasks. The method also includes feeding the loss value for each one of the plurality of augmented input data and the set of parameter values into an optimizer configured to predict a correlation between the set of parameter values and a corresponding loss value during an optimization process, and predicting difficult augmentations, using the optimizer, from the set of parameter values. The method further includes using training input data and randomly selecting a training subset of parameter values augment the training input data to generate a plurality of optimized augmented input data. The input data and the training input data include the same dataset. The training subset of parameter values includes a first portion of parameter values from the difficult augmentations and a second portion of parameter values from the set of parameter values. A size of the plurality of optimized augmented input data is equal to a size of the plurality of augmented input data. During a subsequent training period, the method additionally includes, predicting the target task in each one of the plurality of optimized augmented input data using the target task detector to generate optimized predicted target tasks. The preceding subject matter of this paragraph characterizes example 1 of the present disclosure.

The optimizer is a random forest. The preceding subject matter of this paragraph characterizes example 2 of the present disclosure, wherein example 2 also includes the subject matter according to example 1, above.

The step of randomly selecting the subset of parameter values is based on a domain randomization model. The preceding subject matter of this paragraph characterizes example 3 of the present disclosure, wherein example 3 also includes the subject matter according to any of examples 1-2, above.

The first portion of parameter values is at least fifty percent of the training subset of parameter values. The preceding subject matter of this paragraph characterizes example 4 of the present disclosure, wherein example 4 also includes the subject matter according to any of examples 1-3, above.

The first portion of parameter values is at least seventy-five percent of the training subset of parameter values. The preceding subject matter of this paragraph characterizes example 5 of the present disclosure, wherein example 5 also includes the subject matter according to any of examples 1-4, above.

Predicting difficult augmentations includes predicting ones of the set the parameter values that produce a corresponding loss value greater than a predetermined threshold. The preceding subject matter of this paragraph characterizes example 6 of the present disclosure, wherein example 6 also includes the subject matter according to any of examples 1-5, above.

The target task includes predicting keypoints in a two-dimensional (2D) image. The target task detector is a keypoint detector. The preceding subject matter of this paragraph characterizes example 7 of the present disclosure, wherein example 7 also includes the subject matter according to any of examples 1-6, above.

The augmentation space includes at least one of resizing parameter values, gaussian noise parameter values, brightness parameter values, contrast parameter values, equalize parameter values, gaussian blur parameter values, elastic transformation parameter values, rotation parameter values, and color inversion parameter values. The preceding subject matter of this paragraph characterizes example 8 of the present disclosure, wherein example 8 also includes the subject matter according to example 7, above.

The target task detector is configured to be used in a vision-based tracking system configured to control a process between a first object and a second object. The preceding subject matter of this paragraph characterizes example 9 of the present disclosure, wherein example 9 also includes the subject matter according to any of examples 1-8, above.

The vision-based tracking system is configured to control a refueling operation between a receiver aircraft and a tanker aircraft. The preceding subject matter of this paragraph characterizes example 10 of the present disclosure, wherein example 10 also includes the subject matter according to example 9, above.

The augmentation space is defined based on possible variations of inputs that could be encountered during a process represented by the input data. The preceding subject matter of this paragraph characterizes example 11 of the present disclosure, wherein example 11 also includes the subject matter according to any of examples 1-10, above.

Also disclosed herein is a neural network training system. The neural network training system includes an input data provider configured to generate input data. The input data is configured to be augmentable. The neural network training system also includes a processor and non-transitory computer readable storage media store code. The code is executable by the processer to perform operations including obtaining input data from the input data provider. The code is also executable by the processer to perform operations including defining an augmentation space including a set of parameter values and randomly selecting a subset of parameter values to augment the input data to generate a plurality of augmented input data. During a baseline training period, the code is executable by the processer to perform operations including predicting a target task in each one of the plurality of augmented input data using a target task detector to generate predicted target tasks. The code is further executable by the processer to perform operations including comparing the predicted target tasks in each one of the plurality of augmented input data to known target tasks to calculate a loss value for a corresponding one of the plurality of augmented input data, wherein the loss value defines a difference between the predicted target tasks during the baseline training period and the known target tasks. The code is additionally executable by the processer to perform operations including feeding the loss value for each one of the plurality of augmented input data and the set of parameter values into an optimizer configured to predict a correlation between the set of parameter values and a corresponding loss value during an optimization process, and predicting difficult augmentations, using the optimizer, from the set of parameter values. The code is also executable by the processer to perform operations including using training input data and randomly selecting a training subset of parameter values to augment the training input data to generate a plurality of optimized augmented input data. The input data and the training input data include the same dataset. The training subset of parameter values includes a first portion of parameter values from the difficult augmentations and a second portion of parameter values from the set of parameter values. A size of the plurality of optimized augmented input data is equal to a size of the plurality of augmented input data. During a subsequent training period, the code is further executable by the processer to perform operations including predicting the target task in each one of the plurality of optimized augmented input data using the target task detector to generate optimized predicted target tasks. The preceding subject matter of this paragraph characterizes example 12 of the present disclosure.

The optimizer is a random forest. The preceding subject matter of this paragraph characterizes example 13 of the present disclosure, wherein example 13 also includes the subject matter according to example 12, above.

The step of randomly selecting the subset of parameter values is based on a domain randomization model. The preceding subject matter of this paragraph characterizes example 14 of the present disclosure, wherein example 14 also includes the subject matter according to any of examples 12-13, above.

Predicting difficult augmentations includes predicting ones of the set the parameter values that produce a corresponding loss value greater than a predetermined threshold. The preceding subject matter of this paragraph characterizes example 15 of the present disclosure, wherein example 15 also includes the subject matter according to any of examples 12-14, above.

The input data provider is a camera that is configured to provide a two-dimensional (2D) image of an object. The target task includes predicting keypoints within the 2D image. The target task detector is a keypoint detector. The preceding subject matter of this paragraph characterizes example 16 of the present disclosure, wherein example 16 also includes the subject matter according to any of examples 12-15, above.

The augmentation space includes at least one of resizing parameter values, gaussian noise parameter values, brightness parameter values, contrast parameter values, equalize parameter values, gaussian blur parameter values, elastic transformation parameter values, rotation parameter values, and color inversion parameter values. The preceding subject matter of this paragraph characterizes example 17 of the present disclosure, wherein example 17 also includes the subject matter according to example 16, above.

The augmentation space is defined based on possible variations of inputs that could be encountered during a process represented by the input data. The preceding subject matter of this paragraph characterizes example 18 of the present disclosure, wherein example 18 also includes the subject matter according to any of examples 12-17, above.

The target task detector is configured to be used in a vision-based tracking system configured to control a process between a first object and a second object. The preceding subject matter of this paragraph characterizes example 19 of the present disclosure, wherein example 19 also includes the subject matter according to any of examples 12-18, above.

Further disclosed herein is a neural training apparatus. The neural training apparatus includes a processor and non-transitory computer readable storage media store code. The code is executable by the processer to perform operations including obtaining input data configured to be augmentable. The code is also executable by the processer to perform operations including defining an augmentation space including a set of parameter values and randomly selecting a subset of parameter values to augment the input data to generate a plurality of augmented input data. During a baseline training period, the code is further executable by the processer to perform operations including predicting a target task in each one of the plurality of augmented input data using a target task detector to generate predicted target tasks. The code is additionally executable by the processer to perform operations including comparing the predicted target tasks in each one of the plurality of augmented input data to known target tasks to calculate a loss value for a corresponding one of the plurality of augmented input data. The loss value defines a difference between the predicted target tasks during the baseline training period and the known target tasks. The code is also executable by the processer to perform operations including feeding the loss value for each one of the plurality of augmented input data and the set of parameter values into an optimizer configured to predict a correlation between the set of parameter values and a corresponding loss value during an optimization process, and predicting difficult augmentations, using the optimizer, from the set of parameter values. The code is further executable by the processer to perform operations including using training input data and randomly selecting a training subset of parameter values to augment the training input data to generate a plurality of optimized augmented input data. The input data and the training input data include the same data. The training subset of parameter values includes a first portion of parameter values from the difficult augmentations and a second portion of parameter values from the set of parameter values. A size of the plurality of optimized augmented input data is equal to a size of the plurality of augmented input data. During a subsequent training period, the code is also executable by the processer to perform operations including predicting the target task in each one of the plurality of optimized augmented input data using the target task detector to generate optimized predicted target tasks. The preceding subject matter of this paragraph characterizes example 20 of the present disclosure.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Figure 1:
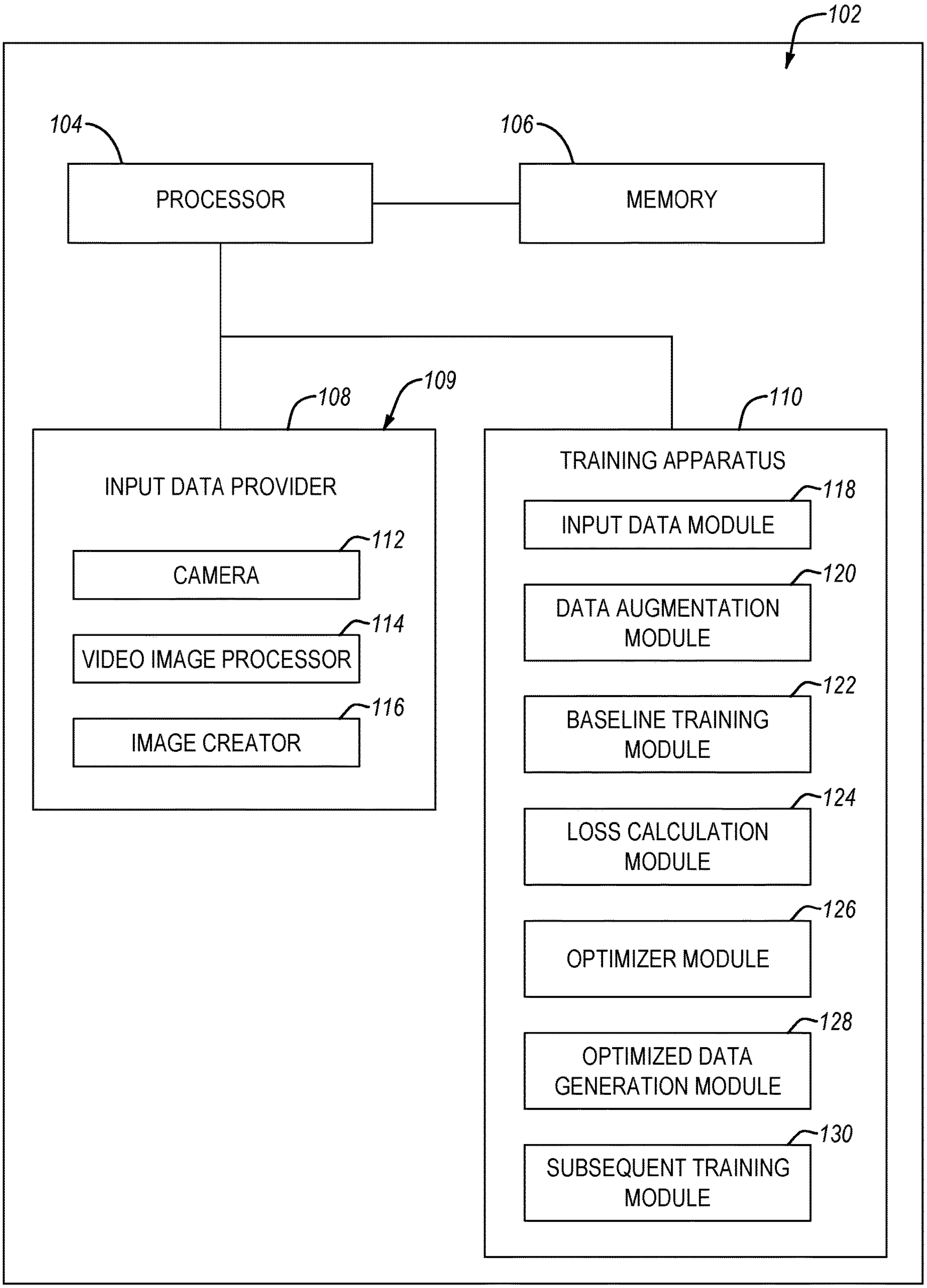
FIG. 1 is a schematic block diagram illustrating one embodiment of a neural network training system, according to one or more examples of the present disclosure.

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples. Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Disclosed herein are examples of methods, systems, and apparatuses of training neural networks for predictive tasks. The following provides some features of at least some examples of the training methods, systems, and apparatus. While neural networks have gained importance in predictive applications, their ability to adapt and perform optimally in all input data scenarios is constrained by the finite learning capacity inherent in their training process. Accordingly, a closed-loop framework, characterized by an iterative and dynamic process, where the training of the neural network adjusts and refines itself based on ongoing feedback and observations in utilized during training. That is, the neural network employs an output generated during an initial training period as an input for subsequent training periods, creating a cyclical and self-improving learning process. In other words, the closed-loop framework is iterative, with each iteration building upon the results gained from the previous training. By strategically targeting and enhancing the training process with challenging regions of input data, the neural network can gain increased exposure to corner cases, or particularly difficult regions. This, in turn, leads to an enhancement in overall performance of the neural network for challenging regions in future applications.

Domain randomization (DR) is a technique used in machine learning, particularly in the training of neural networks. It involves introducing random variations or augmentations to input data during a training process for training a neural network. A primary goal of domain randomization is to expose the neural network to a wide range of possible input scenarios, making the neural network more robust and adaptable to various real-world conditions. That is, by introducing randomness into the training data, the neural network can learn to handle diverse situations, which can be valuable for applications like vision-based tracking and robotics. The method herein leverages domain randomization by assigning weighted importance values to parameters within of the input data. These weighted values enable the selective targeting of augmentations that challenge the neural network (i.e., difficult augmentations). That is, augmentations that corresponding to set of parameters that lead to higher errors in the neural network's predictions. To determine the difficult augmentations, an optimizer, such as a Random Forest classifier, is employed that is trained to predict which sets of augmentations parameters yield more difficult inputs. The difficult inputs are then construed and utilized for subsequent neural network training periods, allowing the neural network to see more corner cases. Accordingly, the difficult augmentations are intentionally emphasized during subsequent training periods to increase the likelihood that the neural network is training on difficult augmentations and enhance the neural network's capacity to adapt and learn from error-prone conditions.

Referring to FIG. 1 is a neural network training system 102. As used herein, a neural network training system is a system designed to facilitate the training and optimization of a neural network. The neural network training system 102 includes a processor 104, memory 106, an input data provider 108, and a neural network training apparatus 110. In some examples, non-transitory computer readable instructions (i.e., code) stored in the memory 106 (i.e., storage media) cause the processor 104 to execute operations, such as the operations in the neural network training apparatus 110.

The input data provider 108 is configured to generate input data that is configured to be augmentable. Input data may be any of various types of data that is augmentable including images, video, text, audio, 3D models, and more. The input data provider 108 may be providing the input data in real-time or the input data provide 108 may have previous provided input data that is stored in memory 106 for later use by the processor 104. In some examples, input data is two-dimensional (2D) images or a video feed from which 2D images can be generated. That is, the input data provider 108 is, in some examples, a camera system 109. In various examples, the camera system 109 includes a camera 112, a video image processor 114, and an image creator 116. The camera 112 is any device capable of capturing images or video and includes a lens or lenses which, in some examples, may have remotely operated focus and zoom capabilities. The video image processor 114 is configured to process the images or video captured by the camera 112, and may adjust focus, zoom, and/or perform other operations to improve the image quality. The image creator 116 assembles the processed information from the video image processor 114 into a final image or representation which can be used for various purposes.

The neural network training apparatus 110, through the processor 104, is configured to training a neural network using input data from the input data provider 108. The neural network training apparatus 110, in some examples, includes an input data module 118, a data augmentation module 120, a baseline training module 122, a loss calculation module 124, an optimizer module 126, an optimized data generation module 128, and a subsequent training module 130.

The input data module 118 is configured to obtain input data from the input data provider 108, directly or indirectly through previously stored input data in memory 106. Input data may be any of various formats, however, input data is typically in a consistent format or can be transformed into a consistent format. For example, input data may consist of entirely 2D images, or, in certain cases, may include a mix of 2D images and video feeds that can be processed to create 2D images. Additionally, in some examples, input data is an individual data point, such as a single 2D image.

The data augmentation module 120 is configured to define an augmentation space. An augmentation space represents a range or set of potential parameter values and/or variations that can be applied to input data during the data augmentation process. The augmentation space defines the boundaries and extent (i.e., set of parameter values) for adjusting or enhancing input data to generate a diverse set of augmented data. The augmentation space may include any of various augmentations applicable to the input data. That is, the augmentation space is defined based on possible variations of inputs that could be encountered during a process represented by the input data. In other words, augmentations are selected given domain knowledge of a predictive task for which the neural network will be used, such that augmented data reflected possible variations of inputs that could be encountered during the predictive task. For example, in cases where the input data is 2D images, the parameter values may include, but are not limited to, resizing, Gaussian noise, brightness, contrast, Gaussian blur, elastic transformation, rotation, and inverting values. In this context, the augmentation space might be represented as a parameter range for brightness and contrast, where all the parameter values define a point with specific brightness and contract values. After defining the augmentation space, the data augmentation module 120 randomly selects a subset of parameter values from the set of parameter values and generates a plurality of augmented input data from the input data. In other words, random sampling within the set of parameter values is utilized to generate the subset of parameter values. This selective approach is adopted due to the finite time and resources available for training the neural network. Consequently, the neural network in trained using the subset of parameter values rather than the entire set of parameter values. In some examples, the random sampling is uniform, meaning that each possible parameter value within the augmentation space has an equal chance of being selected during the data augmentation process.

Domain randomization may be used to generate the subset of parameter values. Domain randomization is a technique applied to the augmentation space to facilitate a process of uniform random sampling and generate the selection of specific augmentations to be applied to the input data. In other words, domain randomization is a method that adds randomness into the augmentation space, ensuring that each potential parameter value within the augmentation space is equally likely to be chosen. This randomness leads to the creation of a diverse set of augmentations, which, when applied to the input data, contributes to a broader and more comprehensive dataset on which to train the neural network, ensuring that the neural network is training on a wide range of real-world scenarios and conditions effectively.

Figure 5B:
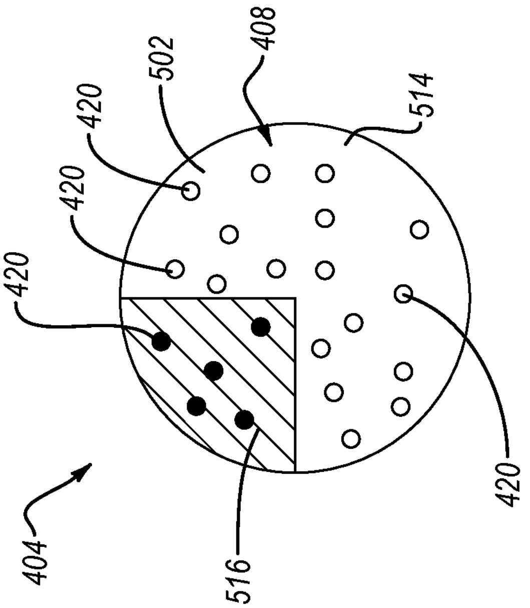
FIG. 5B is a schematic, perspective view of the augmentation space of FIG. 5A for a subsequent training period.
Figure 5A:
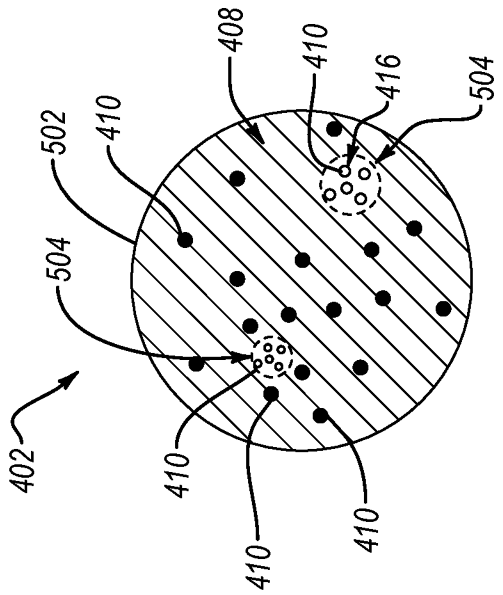
FIG. 5A is a schematic, perspective view of an augmentation space of a neural network for a baseline training period, according to one or more examples of the present disclosure.

Referring to FIG. 5A, an illustration representing an augmentation space 502 during a baseline training period 402 is shown. The augmentation space 502 includes all potential parameter values (i.e., set of parameter values 408) that can be applied to the input data. A subset of parameter values 410, each represented by a dot within the augmentation space 502, are randomly selected from the set of parameter values 408 of the augmentation space 502. In some examples, the subset of parameter values 410 is randomly selected using a domain randomization process. Challenging regions 504, denoted within the augmentation space 502, represent areas where the neural network has increased difficulty with a target task, as measured by a loss value, described below. Parameter values within these challenging regions 504 are a specific type of subset of parameter values 410 referred to as difficult augmentations 416. As the subset of parameter values 410 is randomly sampled from the entirety of the augmentation space 502 it will likely include difficult augmentations 416 from the challenging regions 504 and other augmentations of varying difficulty levels from the set of parameter values 410 outside of the challenging regions 504. It should be noted that the neural network is unaware of the challenging regions 504 within the augmentation space 502, therefore the loss calculation module 124 and the optimizer module 126, described below, are used to possibly identify these regions within the augmentation space 502.

Referring back to FIG. 1, the baseline training module 122 initiates a baseline training period during which the neural network predicts a target task for each one of the plurality of augmented input data. As used herein a target task refers to a specific objective or goal that the neural network is trained to achieve. The nature of the target task can vary, depending on the neural network's intended application, and the target task is the desired output or prediction that the neural network aims to generate when provided with input data. In some examples, such as image recognition, the target task may be predicting an object or category depicted in an image. In other examples, such as a vision-based tracking system, the target task may be predicting keypoints within an image. In yet other examples, such as a text-based application, the target task may be predicting additional text within a given passage. Accordingly, the baseline training module 122 predicts the target task in each one of the augmented input data using the neural network (i.e., target task detector) to generate predicted target tasks. The terms neural network and target task detector may be used interchangeably throughout the description as the target task detector specifically refers to a neural network designed for a particular target task.

The loss calculation module 124 is configured to assess the predicted target tasks generated by the baseline training module 122 for each one of the plurality of augmented input data and compare to a corresponding known target task. The comparison enables the loss calculation module 124 to calculate a loss value for each one of the plurality of augmented input data. That is, the loss calculation module 124 measures how accurately the neural network's predictions align with the expected outcomes, providing a numerical indication of the neural network's performance. In other words, the loss value defines a difference between the predicted target tasks during the baseline training period and the known target tasks. In some examples, when the target task is predicting keypoints on a 2D image, the loss value is computed by measuring the difference between each predicted keypoint and a corresponding known keypoints for all keypoints on the 2D image, and the resulting individual losses are averaged to derive the loss value for the 2D image. The method for calculating the loss value may vary depending on the nature of the input data and the specific target task. Although the method of determining loss value can vary, each one of the plurality of augmented input data will have a corresponding loss value regardless of the method used.

The optimizer module 126 is configured to utilize the loss value associated with each one of the plurality of augmented input data and the set of parameter values to perform an optimization process. During the optimization process, the optimizer module 126 predicts correlations between the set of parameter values and loss values. That is, given any parameter of the set of parameters, the optimizer module 126 will output some predicted loss value. Additionally, the optimizer module 126 predicts the specific augmentations that present greater difficulty for the neural network. That is, identifying difficult augmentations from the set of parameter values. Difficult augmentations are augmentations that result in high loss values, signifying that the neural network struggles with these specific parameter values. In some examples, identifying difficult augmentations refers to selecting ones of the set of parameter values that are expected to yield a loss value greater than (i.e., exceeding) a predetermined threshold. In other examples, difficult augmentations may be defined as a certain percentage above the neural network's average loss value. In yet other examples, the criteria for identifying difficult augmentations varies depending on the neural network's performance objectives. Additionally, the criteria for identifying difficult augmentations can vary in each iteration of the neural network training apparatus 110, such as increasing a predetermined threshold for the loss value on each iteration. The optimizer module 126 is configured to predict at least some of the set of parameter values that will likely result in difficult augmentations, even if those specific parameter values were not included in the subset of parameter values.

The optimized data generation module 128 is configured to use training input data and randomly selected training subset of parameter values to augment the training input data to generate a plurality of optimized augmented input data. A size of the plurality of optimized augmented input data is equal to a size of the plurality of augmented input data. That is, the number of individual augment input data is equal in both the optimized augmented input data and the plurality of augmented input data. Consistently maintaining the size of the augmented input dataset ensures stability and consistency in the neural network's learning process, preventing the introduction of variability that could impact training outcomes. Additionally, the input data and the training input data are the same dataset. In other words, the format and quantity of the input data and the training input data are equal, such that the input data is uniform and consistent for the baseline training period and any subsequent training periods. The training subset of parameter values consists of two distinct portions. A first portion includes parameter values derived from the difficult augmentations that were identified in the optimizer module 126, which are expected to challenge the neural network. These difficult augmentations are intentionally emphasized to enhance the neural network's adaptability and proficiency in handling complex scenarios. Additionally, a second portion of parameter values is selected from the entirety of the set of parameter values. In some cases, domain randomization is used to perform uniform random sampling from the training subset of parameter values. Accordingly, each potential parameter within either the first portion of parameter values or the second portion of parameter values is equally likely to be sampled.

Referring to FIG. 5B, an illustration representing the augmentation space 502 during a subsequent training period 404 is shown. The augmentation space 502 remains consistent between the baseline training period 402 and the subsequent training period 404, maintaining the same set of parameter values 408. However, the distribution or allocation within the augmentation space 502 is weighted differently during the subsequent training period 404. Accordingly, the augmentation space 502 includes a first portion of parameter values 514 and a second portion of parameter values 516. The first portion of parameter values 514 includes parameter values from the challenging regions 504 including difficult augmentations 416 that were derived from the optimizer module 126. The second portion of parameter values 516 include the entirety of the set of parameter values 408. Accordingly, the training subset of parameter values 420 includes parameter values from both the first portion of parameter values 514 and the second portion of parameter values 516.

In some examples, the distribution of the first portion of parameter values 514 is less than the second portion of parameter values 516 within the augmentation space 502. For example, the augmentation space may be comprised of a small percentage of first portion of parameter values 514 compared to the second portion of parameter values 516, such as 10%. In other examples, the distribution of the first portion of parameter values 514 is equal to or greater than the second portion of parameter values 516 within the augmentation space 502. That is, a larger number of augmentations are generated from the closed-loop input data (i.e., difficult augmentations 416) than are available to randomly sample from the remaining set of parameter values 408. In some examples, at least fifty percent of the augmentation space 502 is allocated to the first portion of parameter values 514. As such the training subset of parameter values 420 may comprise at least fifty percent of parameter values from the first portion of the parameter values 514. In other examples, at least seventy-five percent of the augmentation space 502 is allocated to the first portion of parameter values 514. Therefore, the training subset of parameter values 420 may comprises at least seventy-five percent of parameter values from the first portion of the parameter values 514. In yet other examples, the first portion of the parameter values 514 is seventy-five percent of the augmentation space 502 and the second portion of the parameter values 516 is twenty-five percent of the augmentation space 502.

Referring back to FIG. 1, the subsequent training module 130 is configured to initiate a subsequent training period during which the neural network predicts the target task in each one of the plurality of optimized augmented input data generated by the optimized data generation module 128. Accordingly, the subsequent training module 130 predicts the target task in each one of the optimized augmented input data to generate optimized predicted target tasks.

In some examples, the loss calculation module 124 and the optimizer module 126 can be utilized with the optimized predicted target tasks to compute loss values and identify new challenging regions or difficult augmentations, which may demonstrate increased difficulty compared to the baseline training period. Accordingly, this process of inputting the optimized predicted target tasks back into the neural network training apparatus 110 enables the repetition of the closed-loop framework, creating a cyclical and self-improving learning process, where the subsequent training period serves as the baseline training period for the next iteration.

Figure 2:
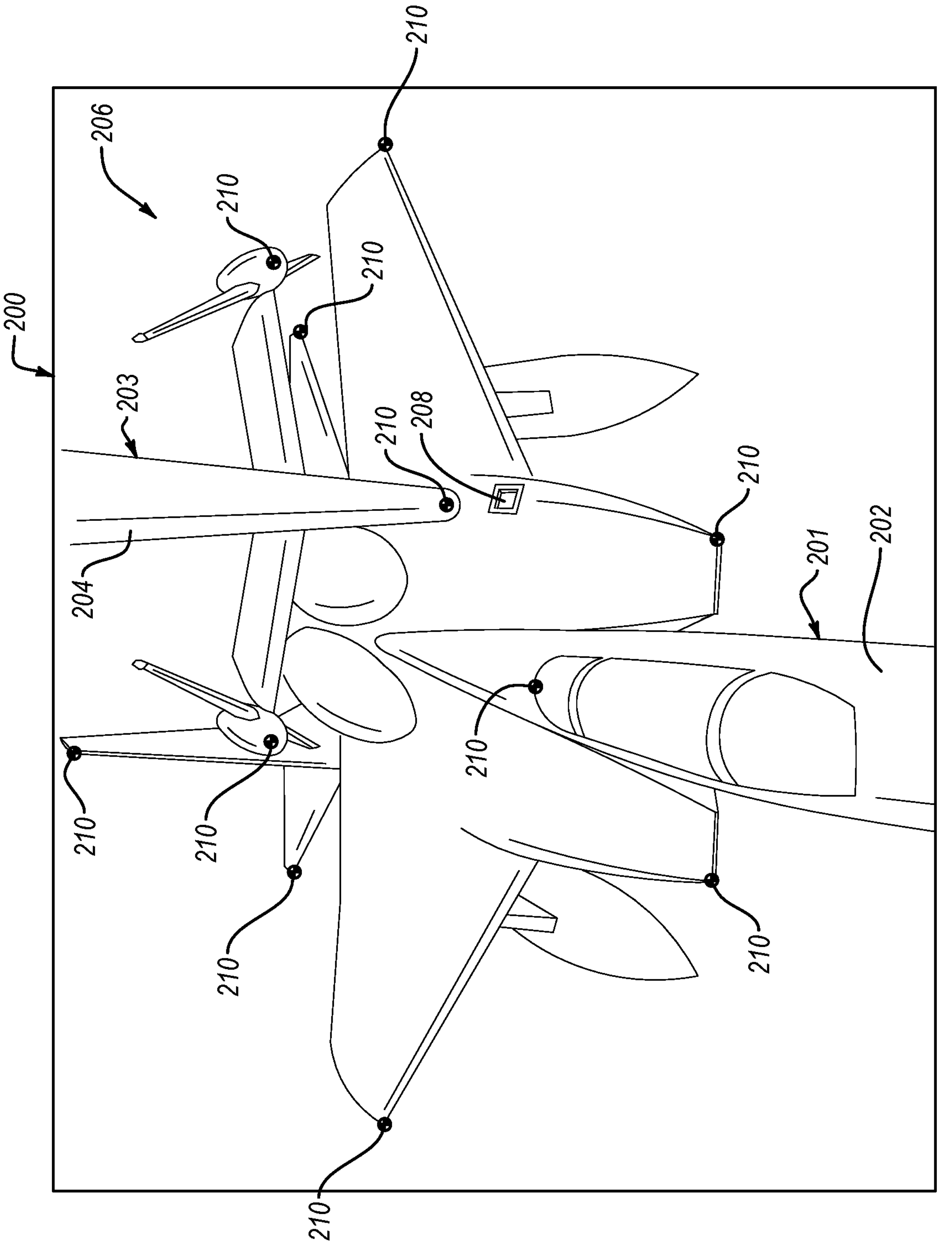
FIG. 2 is a schematic, perspective view of one example of input data used within a neural network training system, where the input data is a two-dimensional image, according to one or more examples of the present disclosure.

Shown in FIG. 2 is one example of input data that may be provided by an input data provider. The input data is a 2D image 200 of a three-dimensional (3D) space provided by a camera system, such as the camera system 109. The camera system 109 may produce the 2D image 200 from a single image captured by the camera 112 or extract the 2D image 200 from a video feed of the camera 112. The 2D image 200 may be provided as an RGB image, that is, an image represented in color using the red, green, and blue color channels. In some examples, such as a vision-based tracking system, the 2D image 200 is configured to include at least a portion of a first object 201, where the first object 201 is tracked relative to a second object 203. In other examples, the 2D image 200 includes at least a portion of the first object 201 as well as a portion of a second object 203. As shown, the 3D space, represented in the 2D image 200, includes both a portion of the first object 201, a receiver aircraft 202, and a portion of the second object 203, a tanker aircraft 204. The tanker aircraft 204 and the receiver aircraft 202 are configured to be coupled together, at a coupling location 208, during a refueling operation.

A target task detector is configured to be trained to predict keypoints, referred to as predicted keypoints 210 locations of salient features, within the 2D image 200. That is, the target task detector (i.e., keypoint detector) is a specific neural network that is trained for and configured to predict the location of the predicted keypoints 210 within a 2D image 200. The 2D image 200, which may be captured during real-time conditions, includes a background 207 and may include various environmental variables. The background 207 and environmental variables may include but not limited to occlusions, self-occlusions, lighting variations, or external disruptions (e.g., weather), which can pose challenges to predicting the predicted keypoints 210 as the visual elements in the image may be wash out, distorted, obscured, etc. The neural network training apparatus 110 is therefore utilized to train the target task detector to predict the predicted keypoints 210 within the 2D image 200 using an iterative process that is focused on improving performance in corner cases, where factors like environmental variables may make keypoint prediction difficult or inaccurate.

Figure 3:
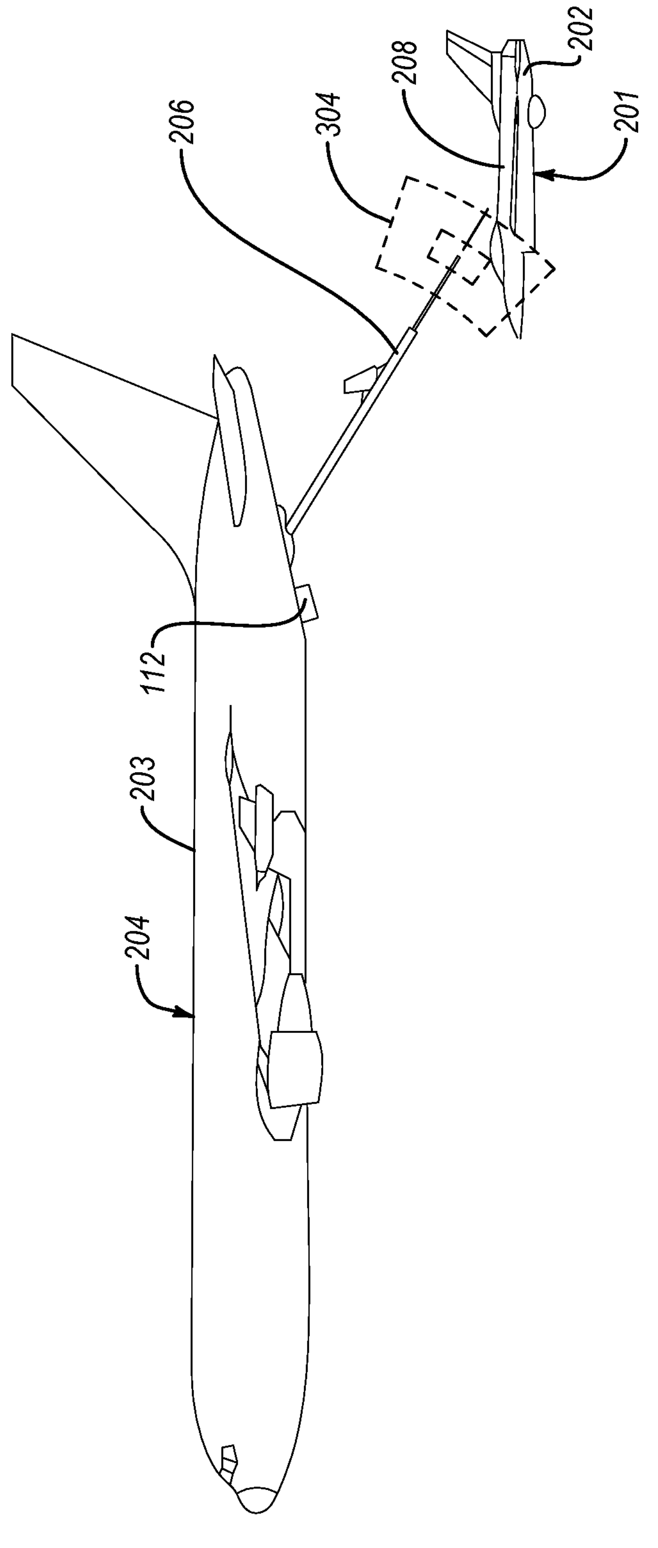
FIG. 3 is a schematic, side view of one embodiment of a vision-based tracking system using a neural network trained using a neural network training system, according to one or more examples of the present disclosure.

Shown in FIG. 3 is one example of a vision-based tracking system that is configured to control a refueling operation (e.g., coupling process) between the receiver aircraft 202 and a deployed refueling boom 206 of the tanker aircraft 204 shown in FIG. 2. The vision-based tracking system is used to perform a process, such as a coupling process, after training the vision-based tracking system to predict keypoints using the neural network training apparatus 110. Accordingly, the 2D image 200 is generated by the camera 112, fixed to the tanker aircraft 204 as the field of view 304 of the camera 112 contains a view of a portion of the receiver aircraft 202, including the coupling location 208 and a view of a portion of the deployed refueling boom 206 of the tanker aircraft 204. Although shown with aircraft, it should be appreciated that a coupling process or close quarter operations may occur between any first object 201 and second object 203. For example, refueling or close quarter operations between other vehicles, not just the aircraft 202 and 204 depicted. The vehicles may be any vehicles that move in a space (in water, on land, in air, or in space). In other examples, a vision-based tracking system is any system that employs visual information, typically captured through cameras or other imaging devices, to monitor and track objects or subjects within a given environment.

For example, vision-based tracking systems may be used within aviation, autonomous vehicles, medical imaging, industrial automation, etc., and used in applications such as aerial refueling processes, object tracking, robot navigation, and more, where understanding the precise location and orientation of objects in a scene is crucial for real-world interactions and decision-making.

Figure 4:
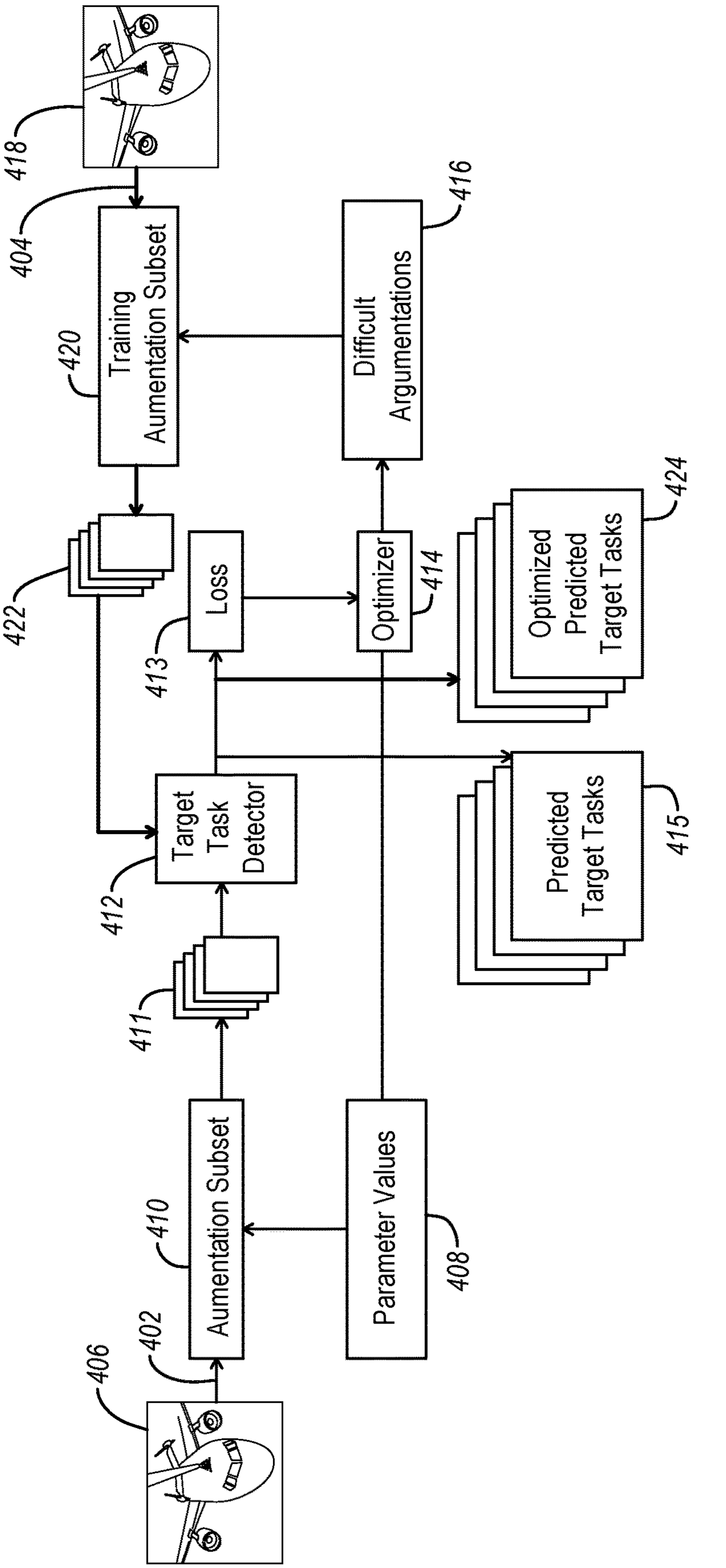
FIG. 4 is a schematic block diagram of a neural network training apparatus, according to one or more examples of the present disclosure.

Referring to FIG. 4, one example of a block diagram of the neural network training apparatus 110 is shown. The neural network training apparatus 110 includes a baseline training period 402, shown using thin lines, and a subsequent training period 404, shown using thick lines. The neural network training apparatus 110 only illustrates one iteration of the training process, however, the training process can be repeated numerous times to obtain a preferred performance of the neural network. Accordingly, subsequent iterations of the training process involve a new baseline training period based on the insights gained from the preceding subsequent training period, creating a cyclical and continually refining learning process. Specifically, a second baseline training period would be based on the subsequent training period 404 and a second subsequent training period would be informed by feedback from the second baseline training period.

The training process involves obtaining input data 406. In some examples, the input data 406 may consist of a single or multiple 2D images. In other examples, the input data 406 may be various other types of uniform formats or input data configured to be transformed into a uniform format. Following this, an augmentation space is defined, including an entirety of a set of parameter values 408 within the augmentation space. The augmentation space is specific to the input data, such that any augmentations to the input data are possible variations that could be encountered during a process represented by the input data. After defining the augmentation space, a subset of parameter values 410 (i.e., augmentation subset) is selected. This augmentation selection process may be performed using domain randomization.

The subset of parameter values 410 is employed to apply augmentations to the input data, resulting in the generation of a plurality of augmented input data 411. That is, each one of the plurality of augmented input data 411 corresponds to one of the subset of parameter values 410. Accordingly, this process effectively expands the input data by incorporating a subset of augmentations to the input data. The plurality of augmented input data 411 is fed into a target task detector 412. The target task detector 412 is configured to predict a target task for each one of the plurality of augmented input data 411 to generate predicted target tasks 415 of a corresponding one of the plurality of augmented input data 411. A loss value 413, defined as a difference between the predicted target task 415 and a known target task, is calculated for each one of the plurality of augmented input data 411, generating a corresponding loss value 413 for each. In some examples, when predicting the target task involves predicting a plurality of target tasks, the loss value 413 may be calculated by averaging the losses for each target task. In other examples, the loss value 413 can be calculated using any of various methods uniformly applied to each one of the plurality of augmented input data 411.

The loss values 413 generated during the baseline training period 402, along with the set of parameter values 408 are input into an optimizer 414 configured to establish correlations between the set of parameter values 408 and loss values 413 during an optimization process. In some examples, the optimizer 414 is a Random Forest. That is, the Random Forest is utilized to analyze and understand the relationship between different parameter values and the resulting loss values. It operates by constructing multiple decision trees during training and outputs the average prediction of individual trees for better accuracy and robustness. This process helps identify patterns and correlations between the parameter values and the corresponding losses in an efficient and effective manner. However, various other optimizers 414 may be used within the neural network training apparatus 110, depending on specific requirements and preferences. A choice of optimizer 414 may vary based on factors such as the nature of the data, the complexity of the neural network, and the objectives of the training process.

The optimizer 414 predicts the specific augmentations (i.e., difficult augmentations 416) from the set of parameter values 408 and/or defines challenging regions 504 within the augmentation space 502 that present greater difficulty for the neural network. The difficult augmentations 416 are augmentations that result in high loss values, signifying that the neural network struggles with these specific parameter values. Augmentations can be classified as difficult augmentations 416 using various classification criteria.

The subsequent training period 404 employs the difficult augmentations 416 to attempt to repeat the difficult augmentations 416 within the training period so the neural network can have more chances to learn from the difficult augmentations 416 and improve its performance. The subsequent training period 404 uses the same dataset as the input data 406 used during the baseline training period 402. Although it is the same dataset, during the subsequent training period 404 it is referred to as training input data 418. The difficult augmentations 416 are included in a training subset of parameter values 420 (i.e., training augmentation subset). The training subset of parameter values 420 also includes selected augmentations from the entirety of the set of parameter values 408. That is, the training subset of parameter values 420 includes a first portion of parameter values from the difficult augmentations 416 and a second portion of parameter values from the set of parameter values 408, as shown in FIG. 5B. Accordingly, difficult augmentations 416 are intentionally emphasized within the training subset of parameter values 420 to enhance the neural network's adaptability and proficiency in handling complex scenarios. The training subset of parameter values 420 is employed to apply augmentations to the training input data 418, resulting in the generation of a plurality of optimized augmented input data 422. That is, each one of the plurality of optimized augmented input data 422 corresponds to one of the training subset of parameter values 420.

The plurality of optimized augmented input data 422 is fed into the target task detector 412. The target task detector 412 is configured to predict a target task (same target task used during the baseline training period) for each one of the plurality of optimized augmented input data 422 to generate optimized predicted target tasks 424 of a corresponding one of the plurality of optimized augmented input data 422. In some examples, a corresponding loss value 413 for the optimized predicted target tasks 424 of ones of the plurality of optimized augmented input data 422 can be calculated and an optimization process performed to identify additional augmentations to continue training the target task detector in additional training periods based on the resulting feedback.

Figure 6:
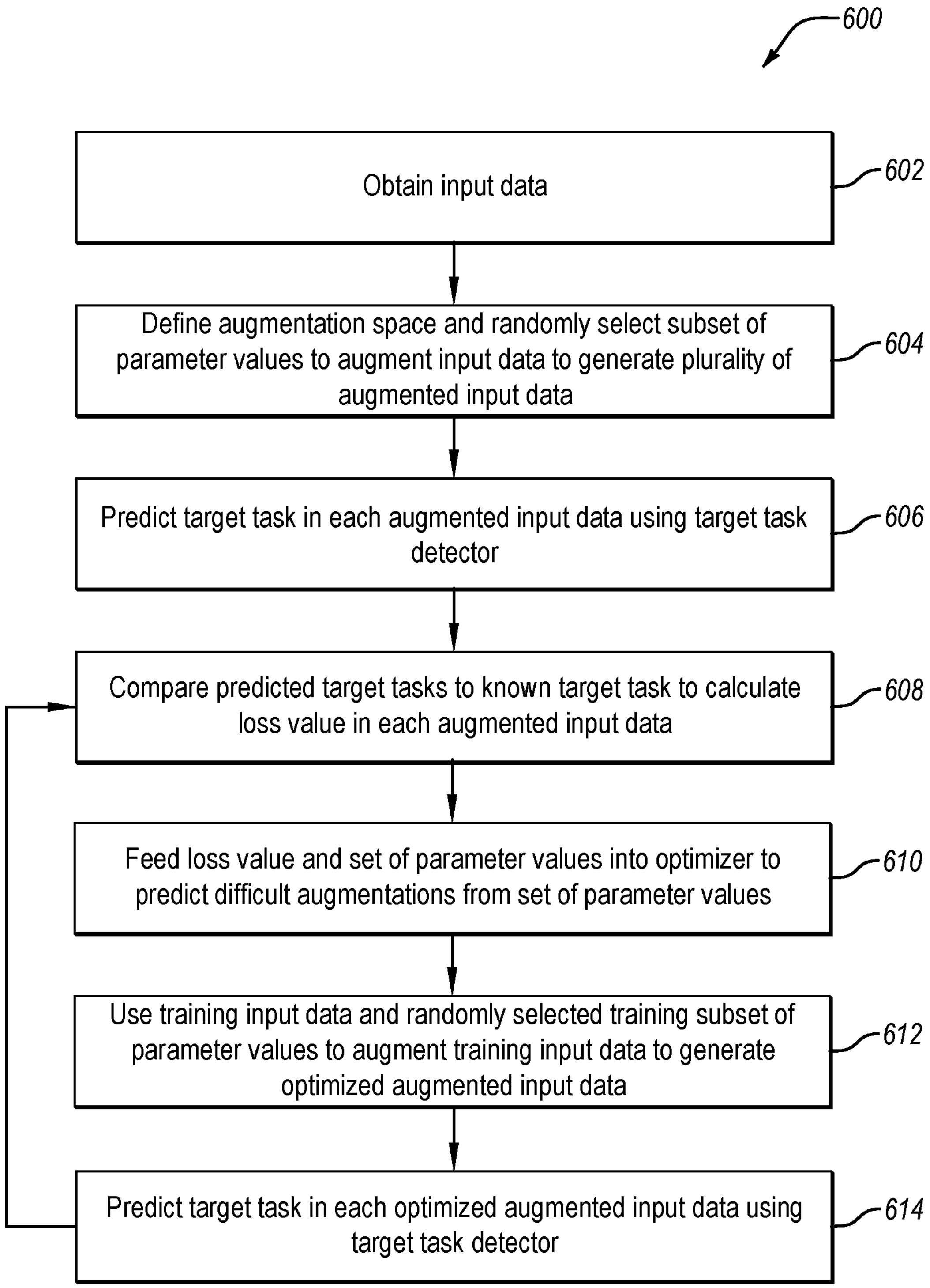
FIG. 6 is a schematic flow diagram of a method of training a neural network used for prediction, according to one or more examples of the present disclosure.

Referring to FIG. 6, a method 600 of training a neural network used for prediction is shown. The method 600 includes (block 602) obtaining input data configured to be augmentable. The method 600 also includes (block 604) defining an augmentation space including a set of parameter values and randomly selecting a subset of parameter values to augment the input data to generate a plurality of augmented input data. During a baseline training period, the method 600 further includes (block 606) predicting a target task in each one of the plurality of augmented input data using a target task detector to generate predicted target tasks. The method 600 additional includes (block 608) comparing the predicted target tasks in each one of the plurality of augmented input data to known target tasks to calculate a loss value for a corresponding one of the plurality of augmented input data. The loss value defines a difference between the predicted target tasks during the baseline training period and the known target tasks. The method 600 also includes (block 610) feeding the loss value for each one of the plurality of augmented input data and the set of parameter values into an optimizer. The optimizer configured to predict correlations between the set of parameter values and a corresponding loss value during an optimization process. The optimizer is further configured to predict difficult augmentations from the set of parameter values.

The method 600 also includes (block 612) using training input data and randomly selecting a training subset of parameter values to generate a plurality of optimized augmented input data. The input data and the training input data include the same dataset. The training subset of parameter values includes a first portion of parameter values selected from the difficult augmentations and a second portion of parameter values selected from the set of parameter values. The first portion of parameter values is greater than the second portion of parameter values. A size of the plurality of optimized augmented input data is equal to a size of the plurality of augmented input data. During a subsequent training period, the method further includes (block 614) predicting the target task in each one of the plurality of optimized augmented input data using the target task detector to generate optimized predicted target tasks.

As referenced herein, the computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A method of training a neural network used for prediction, the method comprising:

obtaining input data configured to be augmentable;

defining an augmentation space comprising a set of parameter values and randomly selecting a subset of parameter values to augment the input data to generate a plurality of augmented input data;

during a baseline training period, predicting a target task in each one of the plurality of augmented input data using a target task detector to generate predicted target tasks;

comparing the predicted target tasks in each one of the plurality of augmented input data to known target tasks to calculate a loss value for a corresponding one of the plurality of augmented input data, wherein the loss value defines a difference between the predicted target tasks during the baseline training period and the known target tasks;

feeding the loss value for each one of the plurality of augmented input data and the set of parameter values into an optimizer configured to predict correlations between the set of parameter values and a corresponding loss value during an optimization process and predicting difficult augmentations, using the optimizer, from the set of parameter values;

using training input data and randomly selecting a training subset of parameter values to augment the training input data to generate a plurality of optimized augmented input data, wherein:

the input data and the training input data comprise the same dataset;

the training subset of parameter values comprises a first portion of parameter values from the difficult augmentations and a second portion of parameter values from the set of parameter values; and a size of the plurality of optimized augmented input data is equal to a size of the plurality of augmented input data; and during a subsequent training period, predicting the target task in each one of the plurality of optimized augmented input data using the target task detector to generate optimized predicted target tasks.

2. The method of claim 1, wherein the optimizer is a random forest.

3. The method of claim 1, wherein the step of randomly selecting the subset of parameter values is based on a domain randomization model.

4. The method of claim 1, wherein the first portion of parameter values is at least fifty percent of the training subset of parameter values.

5. The method of claim 1, wherein the first portion of parameter values is at least seventy-five percent of the training subset of parameter values.

6. The method of claim 1, wherein predicting difficult augmentations comprises predicting ones of the set the parameter values that produce a corresponding loss value greater than a predetermined threshold.

7. The method of claim 1, wherein:

the target task comprises predicting keypoints in a two-dimensional (2D) image; and the target task detector is a keypoint detector.

8. The method of claim 7, wherein the augmentation space comprises at least one of:

gaussian noise parameter values;

brightness parameter values;

contrast parameter values;

equalize parameter values;

gaussian blur parameter values;

elastic transformation parameter values;

rotation parameter values; and color inversion parameter values.

9. The method of claim 1, wherein the target task detector is configured to be used in a vision-based tracking system configured to control a process between a first object and a second object.

10. The method of claim 9, wherein the vision-based tracking system is configured to control a refueling operation between a receiver aircraft and a tanker aircraft.

11. The method of claim 1, wherein the augmentation space is defined based on possible variations of inputs that could be encountered during a process represented by the input data.

12. A neural network training system comprising:

an input data provider configured to generate input data, wherein the input data is configured to be augmentable;

a processor; and non-transitory computer readable storage media store code, the code being executable by the processer to perform operations comprising:

obtaining the input data from the input data provider;

defining an augmentation space comprising a set of parameter values and randomly selecting a subset of parameter values to augment the input data to generate a plurality of augmented input data;

during a baseline training period, predicting a target task in each one of the plurality of augmented input data using a target task detector to generate predicted target tasks;

comparing the predicted target tasks in each one of the plurality of augmented input data to known target tasks to calculate a loss value for a corresponding one of the plurality of augmented input data, wherein the loss value defines a difference between the predicted target tasks during the baseline training period and the known target tasks;

feeding the loss value for each one of the plurality of augmented input data and the set of parameter values into an optimizer configured to predict a correlation between the set of parameter values and a corresponding loss value during an optimization process and predicting difficult augmentations, using the optimizer, from the set of parameter values;

using training input data and randomly selecting a training subset of parameter values to augment the training input data to generate a plurality of optimized augmented input data, wherein:

the input data and the training input data comprise the same dataset;

the training subset of parameter values comprises a first portion of parameter values from the difficult augmentations and a second portion of parameter values from the set of parameter values; and a size of the plurality of optimized augmented input data is equal to a size of the plurality of augmented input data; and during a subsequent training period, predicting the target task in each one of the plurality of optimized augmented input data using the target task detector to generate optimized predicted target tasks.

13. The neural network training system of claim 12, wherein the optimizer is a random forest.

14. The neural network training system of claim 12, wherein the step of randomly selecting the subset of parameter values is based on a domain randomization model.

15. The neural network training system of claim 12, wherein predicting difficult augmentations comprises predicting ones of the set the parameter values that produce a corresponding loss value greater than a predetermined threshold.

16. The neural network training system of claim 12, wherein:

the input data provider is a camera that is configured to provide a two-dimensional (2D) image of an object;

the target task comprises predicting keypoints on the object within the 2D image; and the target task detector is a keypoint detector.

17. The neural network training system of claim 16, wherein the augmentation space comprises at least one of:

gaussian noise parameter values;

brightness parameter values;

contrast parameter values;

equalize parameter values;

gaussian blur parameter values;

elastic transformation parameter values;

rotation parameter values; and color inversion parameter values.

18. The neural network training system of claim 12, wherein the augmentation space is defined based on possible variations of inputs that could be encountered during a process represented by the input data.

19. The neural network training system of claim 12, wherein the target task detector is configured to be used in a vision-based tracking system and the vision-based tracking system is configured to control a process between a first object and a second object.

20. A neural network training apparatus comprising:

a processor; and non-transitory computer readable storage media store code, the code being executable by the processer to perform operations comprising:

obtaining input data configured to be augmentable;

defining an augmentation space comprising a set of parameter values and randomly selecting a subset of parameter values to augment the input data to generate a plurality of augmented input data;

during a baseline training period, predicting a target task in each one of the plurality of augmented input data using a target task detector to generate predicted target tasks;

comparing the predicted target tasks in each one of the plurality of augmented input data to known target tasks to calculate a loss value for a corresponding one of the plurality of augmented input data, wherein the loss value defines a difference between the predicted target tasks during the baseline training period and the known target tasks;

feeding the loss value for each one of the plurality of augmented input data and the set of parameter values into an optimizer configured to predict a correlation between the set of parameter values and a corresponding loss value during an optimization process, and predicting difficult augmentations, using the optimizer, from the set of parameter values;

using training input data and randomly selecting a training subset of parameter values to augment the training input data to generate a plurality of optimized augmented input data, wherein:

the input data and the training input data comprise the same dataset;

the training subset of parameter values comprises a first portion of parameter values from the difficult augmentations and a second portion of parameter values from the set of parameter values; and a size of the plurality of optimized augmented input data is equal to a size of the plurality of augmented input data; and during a subsequent training period, predicting the target task in each one of the plurality of optimized augmented input data using the target task detector to generate optimized predicted target tasks.

* * * * *